United States Patent [19]

James et al.

[11] 4,298,495
[45] Nov. 3, 1981

[54] PROCESSES FOR REDUCING THE OXYGEN CONTENT OF METAL OXIDES

[75] Inventors: Robin H. James, Burghfield Common; James A. Spooner, Reading, both of England

[73] Assignee: United Kingdom Atomic Energy Authority, London, England

[21] Appl. No.: 865,588

[22] Filed: Dec. 29, 1977

[30] Foreign Application Priority Data

Jan. 6, 1977 [GB] United Kingdom ............... 379/77

[51] Int. Cl.$^3$ ..................... G21C 3/62; G21C 21/00
[52] U.S. Cl. ................................. 252/643; 264/0.5; 423/251; 423/261
[58] Field of Search ............... 423/261, 251; 264/0.5; 252/301.1 R

[56] References Cited

U.S. PATENT DOCUMENTS 3,872,022 3/1975 DeHollander ............... 423/261 X

FOREIGN PATENT DOCUMENTS 1295664 11/1972 United Kingdom .

Primary Examiner—Richard E. Schafer
Attorney, Agent, or Firm—Larson and Taylor

[57] ABSTRACT

In a process for reducing the oxygen content of metal oxide material, particularly a nuclear fuel material, the metal oxide material is contained in a plurality of carbon crucibles which are moved through a heated zone in end-to-end contact counter current to a stream of hydrogen-containing gas.

3 Claims, No Drawings

PROCESSES FOR REDUCING THE OXYGEN CONTENT OF METAL OXIDES

BACKGROUND OF THE INVENTION

This invention relates to processes for reducing the oxygen content of metal oxide materials and has one application in producing nuclear fuels.

The use of uranium and plutonium oxide fuels in nuclear reactors is well known. Such oxide fuels may be in pellet or granular form. It is also known to use fuel which is an intimate mixture of these oxides, or a mixed oxide, produced, for example, by processes which involve co-precipitating uranium and plutonium compounds from solution, or by blending powders of the two oxides. For some purposes it is desirable for such oxide fuels to contain less than the stoichiometric amount of oxygen, eg in the oxide fuel represented by $(PuU)O_x$, that x should be less than 2.

Such a fuel having x less than 2 can be produced by forming the mixed oxide or mixture of oxides with x approximately 2 or greater than 2, and reducing this material in a hydrogen-containing gas stream. For example, a material represented by $(PuU)O_x$, where x is greater than 2, can be considered for present purposes as a mixture of $PuO_2$, $UO_2$ and $U_3O_8$. A fuel desired to have x=2 can be produced by reducing this material in such a gas stream, when the $U_3O_8$ component tends to be reduced to $UO_2$. Similarly a fuel having x less than 2 can be reduced by further such reduction, the $PuO_2$ component being reduced to $Pu_2O_3$ (the $UO_2$ component is not reducible to $U_2O_3$ in this way).

In the course of such reductions, water is formed by reaction between the hydrogen and the oxide or oxides, and the presence of this water tends to inhibit the reaction. It has now been discovered that, using a particular type of carbon-crucible furnace in which there is contact between the gas stream and the carbon of the crucibles, the water is apparently removed by reaction with the latter carbon (to form carbon monoxide and hydrogen), thereby allowing the required reduction to proceed.

SUMMARY OF THE INVENTION

The present invention provides a process for reducing the oxygen content of a metal oxide material by contacting the material with a hydrogen-containing gas at an elevated temperature, wherein the material is contained in a plurality of carbon crucibles having apertured ends but being otherwise closed, said plurality of crucibles being moved through a heated zone in end-to-end contact and thereby forming a duct through which the hydrogen-containing gas is passed counter-current to the direction of movement of the crucibles through the heated zone.

The metal oxide material subjected to the process may be either unsintered or pre-sintered. In the former case the process may also serve to sinter the material.

The metal oxide material may be an intimate mixture of uranium and plutonium as oxides or as a mixed oxide, and may be in pellet or granular form. The metal oxide may inititially have the formula $(PuU)O_x$, where x is approximately 2 or greater than 2, the present process serving to reduce x to less than 2. The gas may be a mixture of hydrogen and argon.

Furnaces suitable for carrying out the present process are described in our British Pat. No. 1,295,664. In these furnaces the graphite crucibles are cylindrical, having apertured upper and lower ends, and are moved vertically through the heated zone of the furnace. The lower ends of the crucibles have a pattern of small holes which retain the contents but allow the passage of gas through the crucible. In a modification of the furnaces described in the above-identified Patent specification for use with very small particles, the crucibles may have an open-ended coaxial tube extending through the lower end towards the upper end of each crucible, the particles being held in the annular space surrounding the tube. The lower end of each crucible may be tapered to interfit a corresponding configuration in the upper end of the next crucible below, thereby forming the duct.

It appears that water formed in the reduction of the metal oxide(s) is removed by diffusion into, and reaction with, the carbon of the crucibles in which the metal oxides are enclosed.

There is a tendency for the metal oxide material to react with the carbon walls of the crucibles and adhere thereto in consequence. It is therefore preferred to cover the interior walls of the crucibles with a layer which reduces this tendency, eg a sheet-metal liner (suitably of molybdenum or tungsten), or a coating of, for example molybdenum, tungsten or uranium carbide. It has been found that with crucibles such as those described in British Pat. No. 1,295,664 the presence of a liner or coating on the interior walls of the crucibles does not prevent the reaction between the carbon and the water which allows the required reaction to proceed. Molybdenum and tungsten coatings may be applied by plasma spraying. Such coatings are however less durable than coatings of uranium carbide formed by applying a film of uranium oxide to the walls of the crucibles and then moving the crucible through a furnace such as that described in the above-identified Patent Specification at about 1850° C. whilst passing a purging gas such as argon through the crucibles to convert the oxide to carbide by reaction with carbon from the walls of the crucibles. The uranium oxide film may be applied as a slurry but is preferably applied by plasma spraying.

DESCRIPTION OF THE PREFERRED EMBODIMENTS

The process of the invention will be illustrated by the following Examples which are given by way of example only.

EXAMPLE 1

Cylindrical pellets of $(PuU)O_2$, approximately 5 mm ×5 mm, were fabricated from blended $PuO_2$ and $UO_2$ powders in which the oxygen/metal atomic ratios lay between 2.00 and 2.10, and debonded in carbon dioxide at 900° C. These unsintered pellets were loaded into the graphite crucibles of a furnace of the type described in British Pat. No. 1,295,664. Molybdenum metal sheet, $10^{-2}$ mm thick, covered the interior circular walls of the crucibles. The maximum temperature of the furnace was 1900° C. and the pellets were resident at a temperature greater than 1600° C. for about 4 hours as the crucibles passed through the heated zone. The gas passed downwards through the crucibles was a 4% $H_2$/Ar mixture.

The effect of the above treatment was to sinter the pellets and simultaneously to reduce the oxygen/metal ratio to 1.93. The carbon content of the sintered pellets was less than 20 ppm.

EXAMPLE 2

Pre-sintered $(PuU)O_2$ pellets (sintered in a conventional electric furnace) of similar dimensions to those used in Example 1, and having an oxygen/metal atomic ratio of 1.99 were reduced in the same furnace as in Example 1 and under similar conditions. The effect of the treatment was to reduce the atomic ratio to 1.91. The carbon content of the reduced pellets was greater than in Example 1, up to 300 ppm.

EXAMPLE 3

Pre-sintered $(PuU)O_2$ pellets similar to those used in Example 2, but from a different batch, were treated as described in Example 1. The effect was to reduce the oxygen/metal ratio from 1.99 to 1.86. The carbon content was about 20 ppm.

The carbon content values given above are for the bulk of the pellets. Those pellets in contact with the uncovered graphite bases of the crucibles tended to have a higher carbon content, but this can be obviated by extending the molybdenum lining to cover those surfaces also.

As $PuO_2$ is reducible to $Pu_2O_3$ whereas $UO_2$ is not reducible to $U_2O_3$, the degree of oxygen/metal ratio reduction obtainable with $(PuO)O_2$ increases with the atomic ratio $Pu/Pu+U$ in the material. For example in Examples 2, 1 and 3 the $Pu/Pu+U$ ratios were 18.5%, 27.8% and 31.1% respectively. For these ratios, ultimate (calculated) oxygen/metal ratios of 1.91, 1.86 and 1.84 respectively would be obtainable by reduction to a material represented by $PuO_{1.5}UO_2$. The values obtained in Examples 2 and 3, viz 1.91 and 1.86 respectively, are close to the latter values; the value obtained in Example 1 (1.93) is higher, indicating less complete reduction.

Less complete reduction may be obtained by control of the reaction conditions such as temperature, gas flow rate and the rate at which material passes through the furnace.

This is illustrated in Examples 4 to 11 the results of which are set out in the Table. In Examples 4 to 11 the crucibles used had a liner and a perforated base of tungsten or molybdenum and the reduced oxides contained typically about 50 ppm of carbon. The starting material for Example 4 was unsintered granules having a $Pu/(Pu+U)$ ratio of 31% and in Examples 5 to 11 the starting material was unsintered granules having a $Pu/(Pu+U)$ ratio of 28%. The unsintered granules had sizes in the range 0.8 mm to 1.4 mm and an initial O/M ratio in the range 2.00 to 2.10. The reducing gas was 4% hydrogen in argon. Comparison of Examples 5 to 7 show the effect of increasing the rate at which material passes through the furnace and comparison of Examples 8 to 11 shows the effect of reducing the furnace temperature.

Although described with reference to the reduction of oxide materials containing both Pu and U, the process may also be applicable to the reduction of other metal oxide materials, in particular materials comprising the oxides of only one of these metals, viz $PuO_2$ or $U_3O_8$.

TABLE

| Example | Furnace Temperature °C. | Gas Flow Rate $l.m^{-1}$ | Throughput Rate $g.hr^{-1}$ | Final O/M |
|---|---|---|---|---|
| 4 | 1650 | 3 | 50 | 1.933 |
| 5 | 1650 | 3 | 100 | 1.932 |
| 6 | 1650 | 3 | 200 | 1.940 |
| 7 | 1650 | 3 | 300 | 1.948 |
| 8 | 1590 | 1 | 300 | 1.964 |
| 9 | 1530 | 1 | 300 | 1.961 |
| 10 | 1450 | 1 | 300 | 1.975 |
| 11 | 1400 | 1 | 300 | 1.979 |

We claim:

1. A process for reducing the oxygen content of metal oxide material by contacting the material with a hydrogen-containing gas at an elevated temperature and removing water formed during said reduction which comprises locating said material in each of a plurality of carbon crucibles having apertured ends but being otherwise closed, the interior walls of each of said carbon crucibles being provided with a layer selected from molybendum, tungsten and uranium carbide, moving the crucibles in end-to-end contact through a heated zone and thereby forming a duct, passing hydrogen-containing gas through said duct countercurrent to the direction of movement of the crucibles through the heated zone to reduce the oxygen content of said material, said layer reducing reaction between said material and the carbon of the crucible but not preventing reaction between water formed during said reduction and the carbon of the crucible.

2. A process as claimed in claim 1 wherein the metal oxide material is an intimate mixture of uranium and plutonium oxides or is a mixed oxide of uranium and plutonium.

3. A process as claimed in claim 1 wherein the hydrogen containing gas is a mixture of hydrogen and argon.

* * * * *